Dec. 1, 1964 A. Z. PURZYCKI ETAL 3,159,359

WEB WINDING APPARATUS

Filed May 4, 1962

INVENTORS
ALFRED Z. PURZYCKI
KIYOSHI SUZUKI

BY R. C. Perry

ATTORNEY

United States Patent Office 3,159,359
Patented Dec. 1, 1964

3,159,359
WEB WINDING APPARATUS

Alfred Z. Purzycki, Mount Prospect, and Kiyoshi Suzuki, Chicago, Ill., assignors to Teletype Corporation, Skokie, Ill., a corporation of Delaware Filed May 4, 1962, Ser. No. 192,374
8 Claims. (Cl. 242—75.43)

Figures 1, 2:
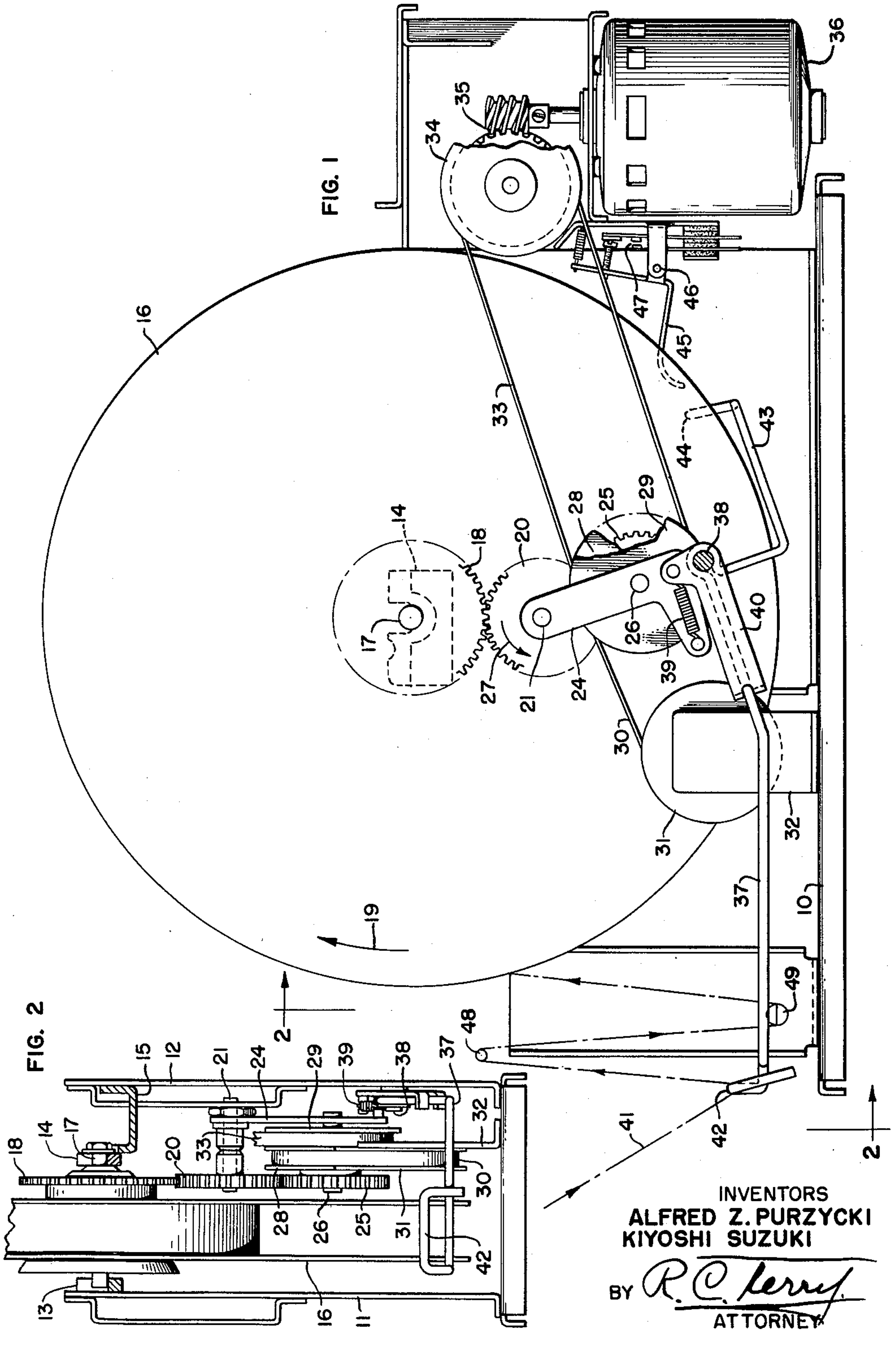

This invention relates to apparatus for winding webs of material and more particularly to web winding apparatus, the speed of which is controlled by the tension of the web.

The invention is disclosed herein as applied to control the tension of perforated telegraph tape being fed from telegraph equipment, such as a perforator or reader, to a tape take-up reel. Although the invention is particularly suited for this application, it should be understood that the apparatus of this invention has utility in a number of different applications in which a web of material is wound upon a take-up reel and it is desired to maintain a constant tension in the web at all times.

Tape take-up reels which have no speed regulation apparatus associated therewith cause the tension in the tape being wound to increase as the amount of tape on the reel increases.

Unregulated tape-winding apparatus such as discussed above tends to form a roll of tape which is loose at the center and compacted tightly on the outside. This undesirable result occurs since the tape must be wound more slowly than is necessary initially in order to maintain the desired tension and speed of take-up with a nearly full reel. In this type of apparatus it is apparent that the linear winding speed of the tape at the start of a new roll may be so slow as to cause an accumulation of tape between the perforator or reader and the tape take-up reel, such an accumulation being highly undesirable.

If the linear speed of winding the tape at the beginning of the roll is sufficient to prevent such accumulation of excess tape, it is possible that the tension on the tape when the reel is almost full may become great enough to cause the tape to tear or break.

In order to overcome the foregoing problems, it has been the practice in the prior art to provide tape take-up reels with various types of slip clutches or brake devices between the reel and power source for slowing down th rotational speed of the take-up reel when the tension on the tape exceeds a predetermined amount. For low speed applications, that is winding tape at the rate of approximately 100 words per minute, a felt slip clutch has been found sufficient to supply the proper regulation to the winding reel.

However, some present telegraph applications operate at the rates of 1,000 to 2,000 words per minute, and the felt clutch is inadequate to provide reliable operation at these high speeds. Other prior art regulating devices using tension responsive brakes, cause undesirable loading of the drive motor since these systems have no provision for releasing the motor when the brake is appleid. Still other systems of the prior art utilize apparatus for temporarily disconnecting and reconnecting the driving mechanism and the take-up reel as the tension varies. This type of operation results in pounding or chattering of the apparatus which does not allow a smooth or uniform take-up of the tape supplied to the reel.

Accordingly, it is an object of this invention to provide a tape winder wherein the tension on the tape is constant at all times.

A further object of this invention is to balance the braking force and the drive force applied to a tape take-up reel in accordance with the tension of the tape supplied to the reel so that as the tension increases the driving force supplied to the reel is reduced and braking action is increased and when the tension of the tape decreases the braking action is decreased and the driving force applied to the take-up reel is increased.

A further object of the present invention is to provide a tape winder in which a tight, uniform wind of tape is obtained.

It is a further object of this invention to provide a tape winder wherein rotation of the take-up reel is automatically stopped when the take-up reel is full.

The present invention accomplishes the above and other desirable objectives by providing an idler gear interposed between the take-up reel driving gear and a pulley driven gear assemblage wherein the shaft for the idler gear pivotally supports a bell crank lever on which the pulley driven gear assemblage is mounted. A dancer lever responsive to variations in the tension of the tape being wound is connected to the bell crank lever and rocks the pulley driven gear assemblage bodily about the periphery of the idler gear. This causes the pulley driven assemblage to either engage a motor driven belt or engage a stationary brake belt depending upon the tightness of the tape being wound on the reel.

Additional features and objects of this invention will become apparent to those skilled in the art upon consideration of the following detailed description taken in conjunction with the accompanying drawings in which:

FIG. 1 is a side view of a tape winder according to the invention with the support bracket broken away to show the essential features of the winder; and FIG. 2 is a view of the winder, partly in section, taken substantially along the line 2—2 of FIG. 1 in the direction of the arrows.

Referring now to the drawing in which the same reference numerals have been used in each figure to denote the same elements, there is shown the tape winder of this invention mounted on a sheet metal base 10 to which are attached a pair of side walls 11 and 12, mostly clearly seen in FIG. 2. A bearing 13 is attached to the side wall 11, and a bearing 14 is attached to the side wall 12 by means of a U-shaped bracket 15. A tape take-up reel 16 is fixed to a shaft 17 which is supported by the bearings 13 and 14 to freely rotate thereon. A driver gear 18 is attached to the reel 16 and is arranged to be driven in the direction of arrow 19, as seen in FIG. 1, by an idler gear 20 which is freely rotatable on a stud shaft 21. As seen in FIG. 2, the shaft 21 is attached to a bracket 23 fixed to the side wall 12.

The shaft 21 also supports the upper end of a bell crank lever 24 which is free to rotate about the shaft 21. A driven gear 25 is freely rotatable on a stud shaft 26 which is fixed to the lower end of the bell crank lever 24. The gear 25 engages the idler gear 20 and drives it in the direction of the arrow 27, shown in FIG. 1.

A rotatable brake pulley 28 and a driven pulley 29 as seen in FIG. 2, are fixed to the gear 25 and rotate therewith about the stud shaft 26. The brake pulley 28 is connected by means of a brake belt 30 to a stationary brake pulley 31 which is supported by a bracket 32 fixed to the base plate 10.

The driven pulley 29 is connected by a drive belt 33 to a driving pulley 34. The driving pulley 34 is driven through suitable gearing 35 by a constant speed motor 36. The particular location of motor 36 shown in FIG. 1 is merely illustrative and other locations and gearing arrangements may be used if so desired.

Movement of the ball crank lever 24 about the shaft 21 is under the control of a dancer lever 37 which pivots about a stud shaft 38 fixed to the side wall 12. A lever member 40 is attached to the dancer lever 37 to rotate therewith about the stud shaft 38, and a normally relaxed tension spring 39 connects the bell crank lever 24 with the member 40. The tape or web of material 41 to be wound upon the reel 16 is fed under a bail 42 that is part of the dancer level 37, over a stationary guide bar 48, and under a stationary guide member 49 to the reel 16.

When a taut-tape condition occurs or the tension of the tape increases, the tape causes the bail 42 to rise thereby rocking the dancer lever 37 in a clockwise direction (FIG. 1). This action causes the end of the spring 39 connected to the lever member 40 to move in a clockwise direction about shaft 38, and the spring 39 then causes the bell crank lever 24 to be rotated about the shaft 21 in a counterclockwise direction. As a result, the drive belt 33 is loosened and the brake belt 30 is tightened upon its pulley 28 and 31.

When the tape 41 is slack, the dancer lever 37 is in the position shown in the drawing, and the spring 39 is compressed. Consequently, the driven gear 25 is in the position shown and the drive belt 33 is tight on the driven pulley 29 causing the gear 25 to drive the reel 16 through the gears 20 and 18. In this position the brake belt 30 is loose.

The weight of the dancer lever 37 may be chosen to be sufficient to establish the desired amount of tension in the tape 41 which causes rocking action of the lever, or the lever 37 may be connected by a suitable spring (not shown) to the base 10 to bias it to its lowest position as shown in the drawing.

The arc through which the bell crank lever 24 moves is limited by the belts 30 and 33. When the dancer lever 37 is in its lowest position, the drive belt 33 tightly engages the driven pulley 29 and the brake belt 30 is loose and supplies little or no friction to the brake pulley 28. As the dancer lever 37 is raised by the tension in the tape, the bell crank lever 24 is rotated counterclockwise gradually to lessen the friction between the drive belt 33 and the driven pulley 29 and to increase the friction between the brake belt 30 and the brake pulley 28. In its extreme uppermost position, the dancer lever 37, through the action of the spring 39, causes the bell crank lever 24 to engage the brake pulley 28 tightly with the brake belt 30 and to loosen the drive belt 33 from the driven pulley 29 thereby stopping rotation of the take-up reel 16. This action is that which would occur for a taut-tape condition resulting from stopping of the tape supply from the reader or perforator.

When power is applied by the drive belt 33 to the driven pulley 29, the gear 25 tends to rotate or to orbit clockwise about the periphery of the idler gear 20 thereby increasing the friction between the drive belt 33 and driven pulley 29. As long as the dancer lever 37 is not raised by an increase in tape tension and the take-up reel 16 does not overrun, this action of the gear 25 keeps the driven pulley 29 tightly engaged with the drive belt 33.

Any tendency for the take-up reel 16 to overrun causes the gear 18 to drive the idler gear 20 in the direction of arrow 27 which in turn tends to drive or to rotate the gear 25 in an orbital path counterclockwise about the periphery of the gear 20 since the gear 25 is mounted on the bell crank lever 24. As will be noted from the foregoing discussion, rotation of the bell crank lever 24 in the counterclockwise direction increases the amount of braking force applied by brake belt 30. Thus, any tendency for the take-up reel 16 to overrun applies more braking pressure thereby automatically counteracting this tendency.

A bent rod 43 suitably attached to the lever member 40 carries a projecting arm 44 into the space between the flanges of the take-up reel 16. When the tape on the take-up reel 16 exceeds a predetermined amount it engages the projecting arm 44 causing the lever 43 to be rocked in a clockwise direction about the pivot stud 38. This action is similar to raising the dancer lever 37 which causes the drive belt 33 to be loosened and the brake belt 30 to be tightened. As a result when the reel 16 becomes full, the tape pressing on projection 44 causes the brake belt 30 to be tightly engaged and the drive belt 33 to be loosened thereby to stop the winding of any more tape. An additional lever 45 also projects between the flanges of the take-up reel 16; and when the tape reel becomes full, the tape causes this lever to rotate about a pivot point 46 in a counterclockwise direction to close a pair of normally open contacts 47. The contacts 47 may be connected to an alarm circuit (not shown) so that the operator will be notified that the tape reel is full.

While the foregoing description of this invention has been limited to a specific embodiment thereof, it will be apparent to those skilled in the art that various changes and modifications of the invention may be made without departing from the spirit and scope of the invention.

What is claimed is:

1. In a web winding apparatus including a take-up reel for receiving a web of material, (a) a driving gear attached to said take-up reel, (b) an idler gear mounted on a shaft in a fixed position relative to said driving gear for transferring rotational energy to and from said driving gear, (c) a movable gear assemblage suspended from the shaft of said idler gear, having a driven gear engaging said idler gear and having first and second operating means associated therewith for controlling the rotation of said driven gear, (d) means for connecting a source of power to said first operating means, (e) a brake, (f) means for connecting said brake to said second operating means, said brake and the source of power being located on diametrically opposite sides of said movable gear assemblage, and (g) means connected to said movable gear assemblage responsive to variations in the tension of said web for causing said movable gear assemblage to travel about the periphery of said idler gear in one direction when said tension decreases to thereby increase the amount of power supplied from the source to said first operating means while at the same time decreasing the braking action applied to said second operating means from said brake, and to cause said movable gear assemblage to travel about the periphery of said idler gear in the other direction when said tension increases to thereby increase the braking action on said second operating means from said brake while decreasing the amount of power supplied to said first operating means from the source of power.

2. Apparatus according to claim 1 wherein said movable gear assemblage is urged to travel in said one direction by the resistance of said idler gear in driving the driving gear and reel and said movable gear assemblage is urged to travel in said other direction by said idler gear in being driven by overrun of the reel due to its momentum.

3. In a web winding apparatus including a take-up reel for receiving a web of material, (a) a driving gear attached to said take-up reel, (b) an idler gear mounted on a shaft in a fixed position relative to said driving gear for transferring rotational energy to and from said driving gear, (c) a movable gear and pulley assemblage suspended from the shaft of said idler gear and having first and second pulleys therein, said movable gear engaging said idler gear, (d) a rotatable driving pulley and a nonrotatable brake pulley diametrically opposed to one another on opposite sides of said movable gear and pulley assemblage, (e) a drive belt interconnecting said first pulley and said driving pulley, (f) a brake belt interconnecting said second pulley and said brake pulley, and (g) means responsive to variations in the tension of said web for causing said movable gear and pulley assemblage to travel about the circumference of said idler gear in one direction when said tension decreases to thereby increase the friction between said first pulley and said drive belt, and to cause said movable gear and pulley assemblage to travel about the circumference of said idler gear in the other direction when said tension increases to thereby increase the friction between said second pulley and said brake belt, said drive and brake belts limiting the arc of travel of said assemblage.

4. In a web winding apparatus including a take-up reel for receiving a web of material, (a) a driving gear attached to said take-up reel, (b) an idler gear mounted on a shaft in a fixed position relative to said driving gear for transferring rotational energy to and from said driving gear, (c) a movable gear and pulley assemblage suspended from the shaft of said idler gear and having first and second pulleys therein, said movable gear engaging said idler gear, (d) a rotatable driving pulley and a nonrotatable brake pulley diametrically opposed to one another on opposite sides of said movable gear and pulley assemblage, (e) a drive belt interconnecting said first pulley and said driving pulley, (f) a brake belt interconnecting said second pulley and said brake pulley, and (g) means responsive to variations in the tension of said web for causing said movable gear and pulley assemblage to travel about the circumference of said idler gear in one direction when said tension decreases to thereby increase the friction between said first pulley and said drive belt, and to cause said movable gear and pulley assemblage to travel about the circumference of said idler gear in the other direction when said tension increases to thereby increase the friction between said second pulley and said brake belt, said drive and brake belts limiting the arc of travel of said assemblage, said driving gear transferring energy to said movable gear and pulley assemblage through said idler gear when said reel tends to overrun causing said movable gear and pulley assemblage to travel about the circumference of said idler gear in said other direction.

5. In a web winding apparatus including a take-up reel for receiving a web of material, (a) a driving gear attached to said take-up reel, (b) an idler gear mounted on a shaft in a fixed position relative to said driving gear for applying power to said driving gear, (c) a bell crank lever pivotally mounted on said idler gear shaft, (d) a movable gear mounted on a second shaft carried by said bell crank lever, said movable gear engaging said idler gear, (e) first and second pulleys fixed to said movable gear to rotate therewith, (f) a rotatable driving pulley and a fixed brake pulley located on opposite sides of said first and second pulleys, (g) a drive belt interconnecting said first pulley and said driving pulley, (h) means for rotating said driving pulley, (i) a brake belt interconnecting said second pulley and said brake pulley, and (j) a dancer lever connected to said bell crank lever, said dancer lever being movable in response to variations in the tension of said web to cause said bell crank lever to rotate in one direction to increase the friction between said first pulley and said drive belt when said tension is reduced and to rotate in the other direction to increase the friction between said second pulley and said brake belt when said tension is increased.

6. In a web winding apparatus including a take-up reel for receiving a web of material, (a) a driving gear attached to said take-up reel, (b) a movable gear, (c) an idler gear mounted on a shaft in a fixed position relative to said driving gear for applying power to said driving gear from said movable gear, (d) a bell crank lever pivotally mounted on said idler gear shaft, said movable gear being mounted on a second shaft carried by said bell crank lever, (e) first and second pulleys fixed to said movable gear to rotate therewith, (f) a rotatable driving pulley, (g) a fixed brake pulley, (h) a drive belt interconnecting said first pulley and said driving pulley, (i) means for rotating said driving pulley, (j) a brake belt interconnecting said second pulley and said brake pulley, and (k) a dancer lever connected to said bell crank lever to cause said bell crank lever to rotate in one direction to increase the friction between said first pulley and said drive belt and to rotate in another direction to increase the friction between said second pulley and said brake belt.

7. Apparatus according to claim 6 wherein said movable gear on said bell crank lever is urged to travel about the periphery of said idler gear in said one direction by the resistance of said idler gear in driving said driving gear and reel and said movable gear is urged to travel about the periphery of said idler gear in said other direction by said idler gear in being driven by overrun of the reel due to its momentum.

8. Tension controlling mechanism for web winding apparatus having a take-up reel and a constant speed motor for supplying power to drive the reel including (a) a driven pulley, a brake pulley and a driven gear rotatable as a unit, (b) a driving belt interconnecting the motor and said driven pulley, (c) a lever having a stud shaft fixed to it for rotatably supporting said pulley and gear unit, (d) a driving gear for driving said reel, (e) an idler gear meshing with said driven gear and said driving gear, (f) a stud shaft for supporting said idler gear for rotation and for pivotally supporting said lever for oscillation to carry said lever supported stud shaft in an orbital path about the axis of said idler gear, (g) a nonrotatable pulley, (h) a brake belt interconnecting said brake pulley and said nonrotatable pulley, and (i) means responsive to tension in the web being wound for oscillating said lever to tighten the driving belt on its pulleys when tension on the web is reduced and to tighten said brake belt on its pulleys when tension in the web is increased.

References Cited in the file of this patent

UNITED STATES PATENTS

| | | |
|---|---|---|
| 2,082,633 | Johnstone | June 1, 1937 |
| 2,507,297 | Bouget | May 9, 1950 |
| 2,621,500 | Clentimack | Dec. 16, 1952 |